United States Patent
Edirisooriya et al.

(10) Patent No.: US 8,533,401 B2
(45) Date of Patent: Sep. 10, 2013

(54) IMPLEMENTING DIRECT ACCESS CACHES IN COHERENT MULTIPROCESSORS

(75) Inventors: Samantha J. Edirisooriya, Tempe, AZ (US); Sujat Jamil, Chandler, AZ (US); David E. Miner, Chandler, AZ (US); R. Frank O'Bleness, Tempe, AZ (US); Steven J. Tu, Phoenix, AZ (US); Hang T. Nguyen, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 457 days.

(21) Appl. No.: 10/331,688

(22) Filed: Dec. 30, 2002

(65) Prior Publication Data

US 2004/0128450 A1 Jul. 1, 2004

(51) Int. Cl.
*G06F 12/00* (2006.01)

(52) U.S. Cl.
USPC .......................... 711/141; 711/113

(58) Field of Classification Search
USPC .......... 711/122, 128–130, 141, 113; 709/201
See application file for complete search history.

(56) References Cited

U.S. PATENT DOCUMENTS

| | | | | |
|---|---|---|---|---|
| 5,537,574 A | * | 7/1996 | Elko et al. | 711/141 |
| 5,797,026 A | * | 8/1998 | Rhodehamel et al. | 712/1 |
| 5,944,780 A | * | 8/1999 | Chase et al. | 709/201 |
| 6,012,127 A | * | 1/2000 | McDonald et al. | 711/141 |
| 6,182,111 B1 | * | 1/2001 | Inohara et al. | 709/201 |
| 6,353,877 B1 | * | 3/2002 | Duncan et al. | 711/155 |
| 6,651,145 B1 | | 11/2003 | Nguyen et al. | |
| 6,775,748 B2 | | 8/2004 | Jamil et al. | |
| 2002/0095554 A1 | * | 7/2002 | McCrory et al. | 711/144 |
| 2002/0166031 A1 | * | 11/2002 | Chen et al. | 711/141 |
| 2003/0105796 A1 | | 6/2003 | Sandri et al. | |

OTHER PUBLICATIONS

U.S. Appl. No. 10/039,060, filed Jan. 2, 2002, Jamil et al.
U.S. Appl. No. 10/199,580, filed Jul. 19, 2002, Edirisooriya et al.
U.S. Appl. No. 10/073,492, filed Feb. 11, 2002, Edirisooriya et al.
U.S. Appl. No. 10/303,931, filed Nov. 25, 2002, Edirisooriya et al.
U.S. Appl. No. 11/084,286, filed Mar. 18, 2002, Edirisooriya et al.
U.S. Appl. No. 10/335,131, filed Dec. 31, 2002, Edirisooriya et al.
U.S. Appl. No. 10/123,401, filed Apr. 16, 2002, Edirisooriya et al.
U.S. Appl. No. 10/316,276, filed Dec. 10, 2002, Edirisooriya et al.
U.S. Appl. No. 10/316,785, filed Dec. 10, 2002, Edirisooriya et al.
U.S. Appl. No. 10/262,363, filed Sep. 30, 2002, Nguyen et al.
U.S. Appl. No. 10/338,207, filed Jan. 7, 2003, Nguyen et al.
U.S. Appl. No. 11/124,001, filed May 6, 2005, Nguyen et al.
U.S. Appl. No. 11/124,309, filed May 6, 2005, Nguyen et al.
U.S. Appl. No. 11/123,503, filed May 6, 2005, Nguyen et al.
U.S. Appl. No. 10/357,780, filed Feb. 4, 2003, Nguyen et al.
U.S. Appl. No. 10/331,688, filed Dec. 30, 2002, Nguyen et al.
U.S. Appl. No. 10/883,363, filed Jun. 30, 2004, Nguyen et al.

(Continued)

*Primary Examiner* — Hashem Farrokh (74) *Attorney, Agent, or Firm* — Blakely, Sokoloff, Taylor & Zafman LLP (57) ABSTRACT

Non-processor agents, such as bus agents, may directly access processor caches. A coherency protocol ensures that cache coherency is maintained.

4 Claims, 7 Drawing Sheets

(56) References Cited

OTHER PUBLICATIONS

U.S. Appl. No. 10/881,607, filed Jun. 29, 2004, Nguyen et al.
U.S. Appl. No. 10/877,587, filed Jun. 24, 2004, Murray et al.
U.S. Appl. No. 10/974,377, filed Oct. 27, 2004, Edirisooriya.
U.S. Appl. No. 10/977,830, filed Oct. 28, 2004, Edirisooriya.
U.S. Appl. No. 10/882,509, filed Jun. 30, 2004, Nguyen et al.
U.S. Appl. No. 10/997,605, filed Nov. 23, 2004, Nguyen et al.
U.S. Appl. No. 11/027,639, filed Dec. 29, 2004, Nguyen et al.
U.S. Appl. No. 11/027,649, filed Dec. 29, 2004, Nguyen et al.
U.S. Appl. No. 11/017,183, filed Dec. 16, 2004, Murray et al.
U.S. Appl. No. 10/620,629, filed Jul. 14, 2003, Nguyen et al.
U.S. Appl. No. 09/746,487, filed Dec. 22, 2000, Nguyen et al.
Tomasevic et al—1994—Hardware Approaches to Cache Coherence in Shared-Memory Multiprocessors, Part 1.
Tomasevic et al.—Dec. 1994—Hardware Approaches to Cache Coherence in Shared-Memory Multiprocessors, Part 2.

* cited by examiner

IMPLEMENTING DIRECT ACCESS CACHES IN COHERENT MULTIPROCESSORS

BACKGROUND

This invention relates generally to processor cache architectures. More particularly, the present invention relates to multiprocessors that provide hardware cache coherency using shared states.

In typical computer systems, non-processor agents, such as input/output controllers and direct memory access devices, as two examples, are not able to push data directly to the local cache of a processor. However, some applications could benefit if non-processor agents were permitted to push data directly into a processor cache.

For instance, in a network packet processing system, allowing a non-processor agent to push a packet directly into a processor cache, rather than into main memory, enables the processor to read the packet directly from the local cache instead of from memory. This may be an important feature since the performance of network processors is measured by the number of packets they can process per second. In effect, the processor may process more packets because it does not need to access the information from memory, place it in a cache and then read it from the cache.

Thus, it would be desirable to enable non-processor agents to access caches in multiprocessor systems.

DETAILED DESCRIPTION

Figure 1:
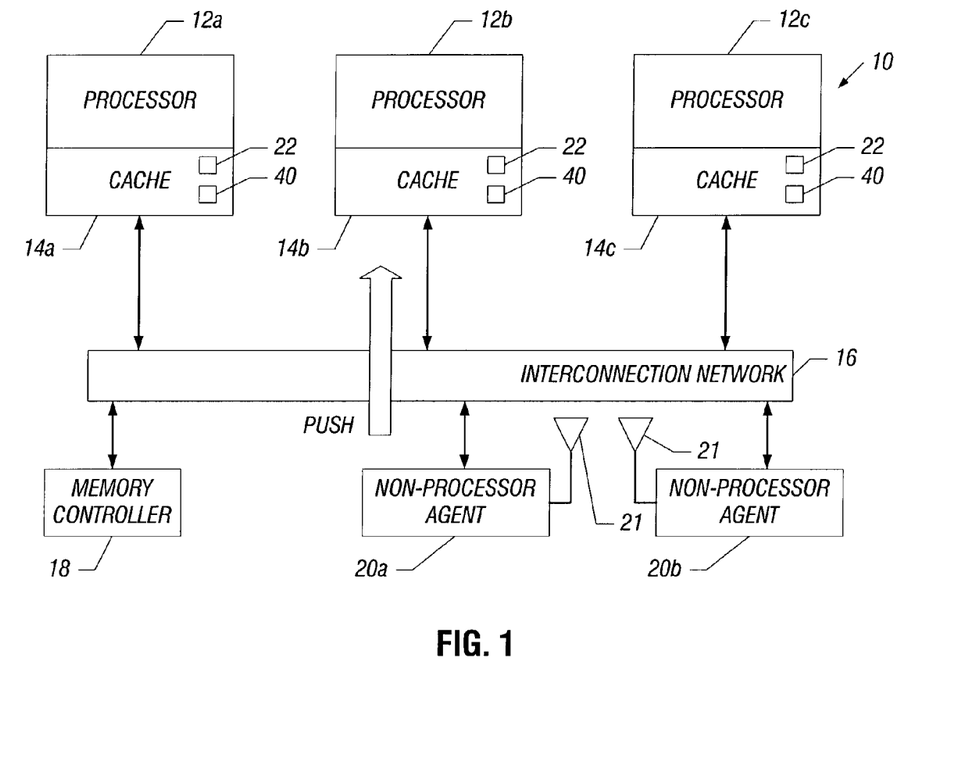
FIG. 1 is a schematic depiction of one embodiment of the present invention.

Referring to FIG. 1, a processor-based system may include a plurality of processors, including the processors 12a, 12b, and 12c in one embodiment. In some embodiments, only two processors may be included and in other embodiments, more than two processors may be utilized. The processors 12 may be general purpose processors, digital signal processors, or a combination of a digital signal and general purpose processor in one embodiment.

Each processor 12 may include a cache 14. The cache 14 may be integrated in the same integrated circuit with the processor 12 in one embodiment. Coupled to each processor 12 is an interconnection network 16. The network 16 may in turn be coupled to a memory controller 18 and one or more non-processor agents 20, such as medium access control (MAC) devices for a wireless network. A coherency protocol 22 and a protocol 40, discussed later, may be resident in the caches 14 in one embodiment.

The embodiment of FIG. 1 is a wireless network processor-based system where the agents 20 are wireless interfaces including antennas 21. However, the present invention is not limited to any particular application, but instead may be applicable to any situation where it is advantageous to allow a non-processor agent to directly access a processor cache.

Traditionally, hardware-based cache coherency is enforced by a caching agent that obtains the exclusive ownership of a cache line before the cache line in the agent's cache may be modified. In one embodiment of the present invention, a non-processor agent 20a, such as a MAC, may "push" data directly to a processor cache, such as a cache 14b, as shown in FIG. 1. Since non-processor agents are not conventionally able to push data directly into a processor cache 14, the applicable caching agent performs additional steps to guarantee memory consistency.

In the discussion that follows, requests to push data directly to a processor cache 14 are targeted to only one processor in the coherency domain. However, in other embodiments, the push requests may involve more than one processor. Moreover, in the example provided below, the modified owned exclusive shared invalid (MOESI) cache coherency protocol is used. However, those skilled in the art will appreciate that the same principles can be applied to any cache coherency protocol that uses a shared state, including modified exclusive shared invalid (MESI) and modified shared invalid (MSI) cache coherency protocols.

In the MOESI protocol, the shared state is different than in prior protocols and the owned state is new. In the MOESI protocol the shared state cannot be consistent with memory. However, the shared state still involves more than one processor having the same cache line. A second processor can access a line modified by a first processor. The line is in the shared state for the second processor and the owned state for the first processor. In the modified state there is only one updated copy of the cache line and that copy is not consistent with memory. In the exclusive state data is read and then you go to the exclusive state. In the exclusive state one processor has a copy and no other processor has the cache line and the cache line is consistent with memory. The invalidate state involves a cache line that got invalidated or is not present.

Figure 2:
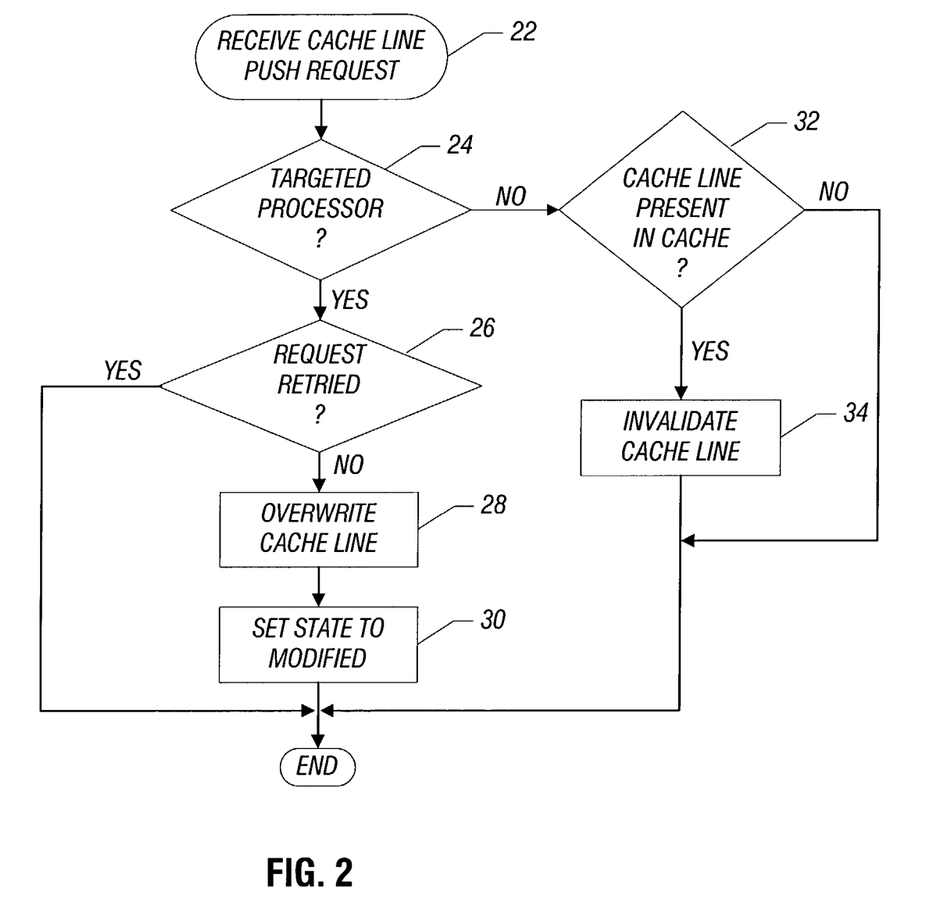
FIG. 2 is a flow chart for one embodiment of the present invention.

Referring to FIG. 2, in one embodiment of the present invention, the coherency protocol 22 may be implemented as software that may be stored, for example, within a cache 14. Alternatively, the protocol 22 may be stored in any memory available on the processor-based system. In addition, the cache coherency protocol 22 may be implemented in hardware, for example in one or more of the caches 14.

Initially, upon receiving a cache line push request from an agent 20, a check at diamond 24 determines whether the subject processor 12 is the processor targeted by the request, as indicated in diamond 24, in FIG. 2. Thus, in the case of the push request illustrated in FIG. 1, the processor 12b is the targeted processor, while the processors 12a and 12c are the non-targeted processors.

If the subject processor is the target of the push request, a check at diamond 26 determines whether the request is retried. If the request is not retried, the cache line is simply overwritten and set to the modified state as indicated in blocks 28 and 30.

However, if the subject processor 12 is not a targeted processor, then a check at diamond 32 determines whether the cache line is already present in the cache 14 in the modified, exclusive, shared, or owned state. If so, the cache line is invalidated as indicated in block 34.

In another embodiment, after it is determined that the processor is not the targeted processor, a check can determine if the request was retried as in diamond 26. If not, the flow ends but, otherwise, the flow continues to diamond 32.

Figure 3:
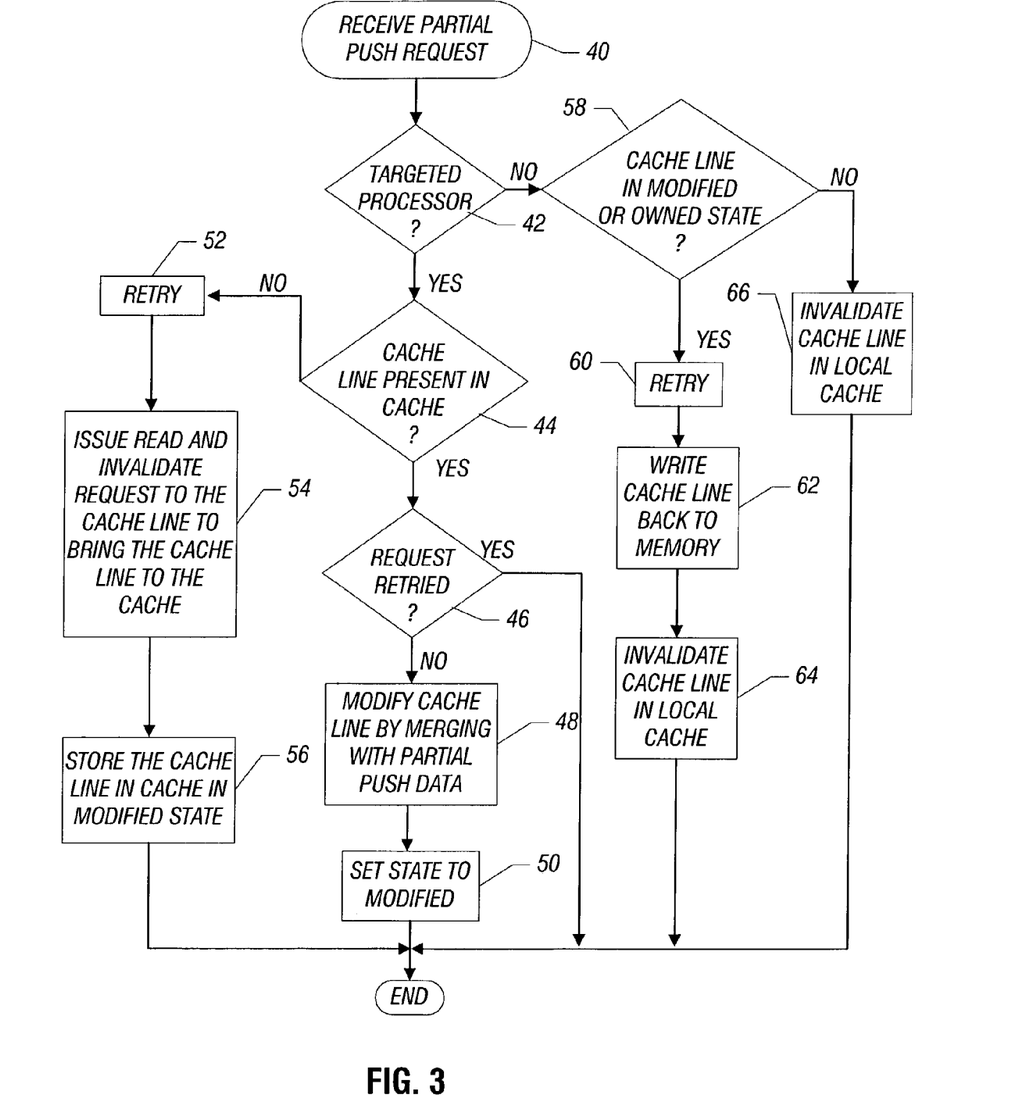
FIG. 3 is a flow chart for another embodiment of he present invention.

Referring to FIG. 3, a hardware or software solution is illustrated for the situation where a processor 12 receives a partial push request. A partial push request is a request to access less than an entire cache line.

The protocol 40, illustrated in FIG. 3, begins by determining whether the subject processor 12 is the targeted processor as indicated in diamond 42. If so, a check at diamond 44 determines if the cache line is already present in the processor's cache in the modified, owned, exclusive, or shared state. If so, a check at diamond 46 determines whether the request was retried. If not, the cache line is modified by merging it with the partial push data and set to the modified state as indicated in blocks 48 and 50.

If the cache line is not present in the cache 14 of the targeted processor, as determined in diamond 44, the request is retried at block 52. Then a read and invalidate (read for ownership) request to that cache is issued to bring the cache line to the relevant cache as indicated at block 54. The cache line is then stored in the cache in the modified state as indicated in block 56.

In the case of a non-targeted processor, as determined in diamond 42, a check at diamond 58 determines whether the cache line is in the modified or owned state. If so, the request is retried as indicated in block 60. Then the cache line is written back to system memory as indicated in block 62. The cache line is then invalidated in the local cache as indicated in block 64.

Finally, if the cache line is not in the modified or owned states, as determined in diamond 58, or in other words is in the exclusive or shared state, then the cache line is invalidated in the local cache as indicated in block 66.

In some embodiments of the present invention, non-processor devices coupled to a processor may directly move data directly into a processor's cache. This avoids the need for two distinct memory operations, including a write generated by the non-processor agent to memory, followed by a read generated by the processor to bring the data into the processor from memory. With embodiments of the present invention, a non-processor agent can use just one write operation to move data into a processor cache. This improves the latency (when accessing full cache lines and, in some cases, partial cache lines) compared to traditional architectures and reduces processor bus traffic in some embodiments.

In another embodiment, if the processor is not the targeted processor, a check may determine if the request was retried. If so, the flow ends but, otherwise, the flow continues with diamond 58.

Figure 4:
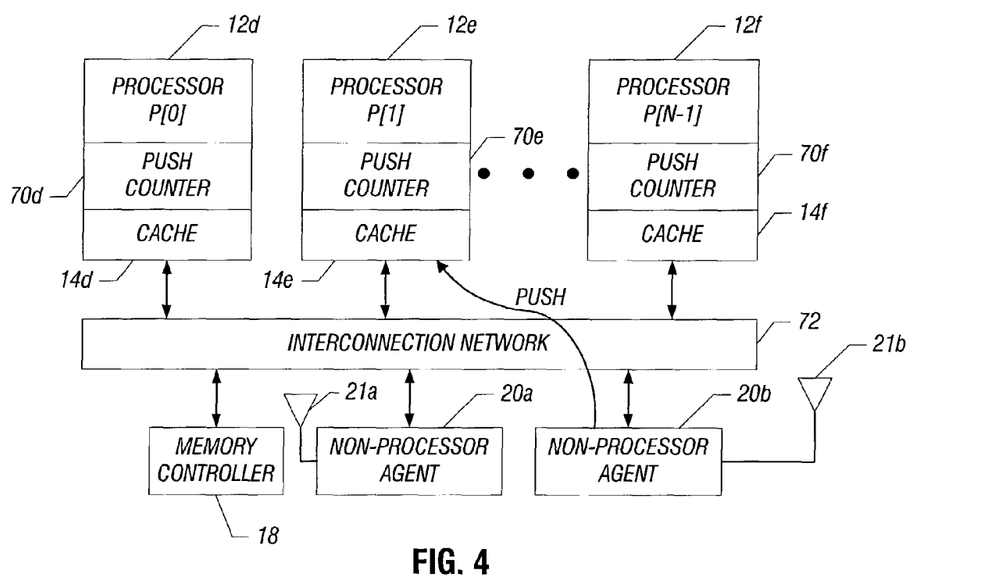
FIG. 4 is a schematic depiction of another embodiment of the present invention.

Referring to FIG. 4, a system, similar to the one shown in FIG. 1, includes processors 12d through 12f, caches 14d through 14f, and push counters 70d through 70f. The processors 12 may be coupled to non-processor agents 20a and 20b through an interconnection network 72 in one embodiment. The agents 20 may be wireless interfaces, in one embodiment of the present invention, having antennas 21a and 21b. The interconnection network 72 also couples a memory controller 18.

While a network processor-based system is illustrated, those skilled in the art will appreciate that a variety of other arrangements may also be utilized.

In the embodiment shown in FIG. 4, a push functionality is implemented which enables a non-processor agent, such as the agent 20b, to push data directly to a cache, such as a cache 14a, while preserving the coherency of the multiprocessor system. A mechanism dynamically identifies a processor 12 that will accept the push operation. Assuming that there are N processors, including the processors P(0), P(1), and P(N−1) in the coherency domain, each processor 12 implements a roll-over push counter 70 that counts from zero to N−1. Coming out of a reset, all of the counters 70 may be reset to zero.

Whenever a push request is generated, the processors 12 increment their push counters 70 by one. The processor 12 whose identifier matches the current push counter 20 value, then claims the push operation and stores the associated data in its cache 14.

All other processors 12 invalidate the cache line in their local caches 14. Since processor identifiers within the multiprocessor system are unique, one and only one processor 12 accepts any push operation. In one embodiment of the present invention, a selection mechanism may guaranty that only one processor responds to a push operation.

Thus, while the non-processor agents 20 may be allowed to push data directly into a processor cache 14, the processors 12 in that coherency domain perform additional steps that guarantee memory consistency. Again, a set of rules, in accordance with one embodiment, are described below assuming the MOESI cache protocol. However, again, any cache coherency protocol that includes a shared state may be utilized.

Figure 5:
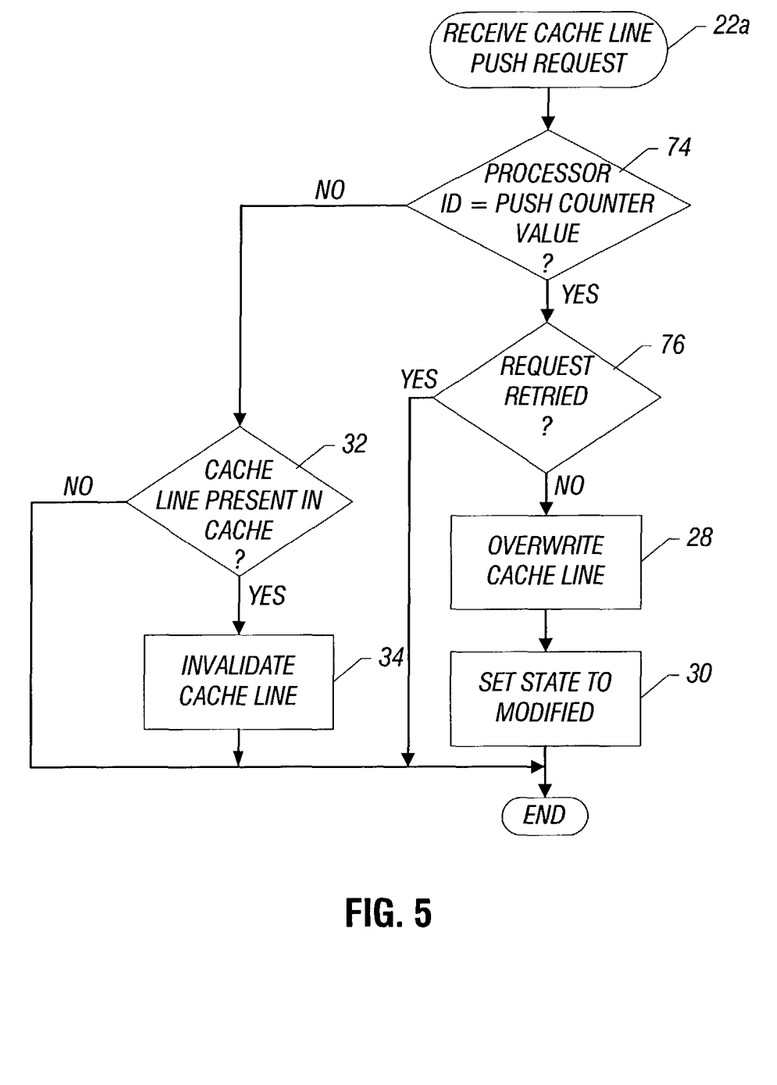
FIG. 5 is a flow chart for the embodiment shown in FIG. 4 in accordance with one embodiment of the present invention.

Referring to FIG. 5, the protocol 22a for receiving a cache line push request may be implemented in software or hardware as described previously. If the subject processor's identifier is equal to the push counter 70 value as determined in diamond 74, a check at diamond 76 determines whether the request was retried. If not, the cache line is simply overwritten and the state is set to modify as indicated in blocks 28 and 30.

If the processor's identifier is not equal to the push counter value or the request is not retried, a check at diamond 32 determines whether the cache line is already present in the cache of the subject processor. If so, the cache line is invalidated as indicated in block 34.

In another embodiment, if the processor identifier does not equal the push counter value, a check can determine if the request was retried. If so, the flow may end but, otherwise, the flow may continue to diamond 32.

Figure 6:
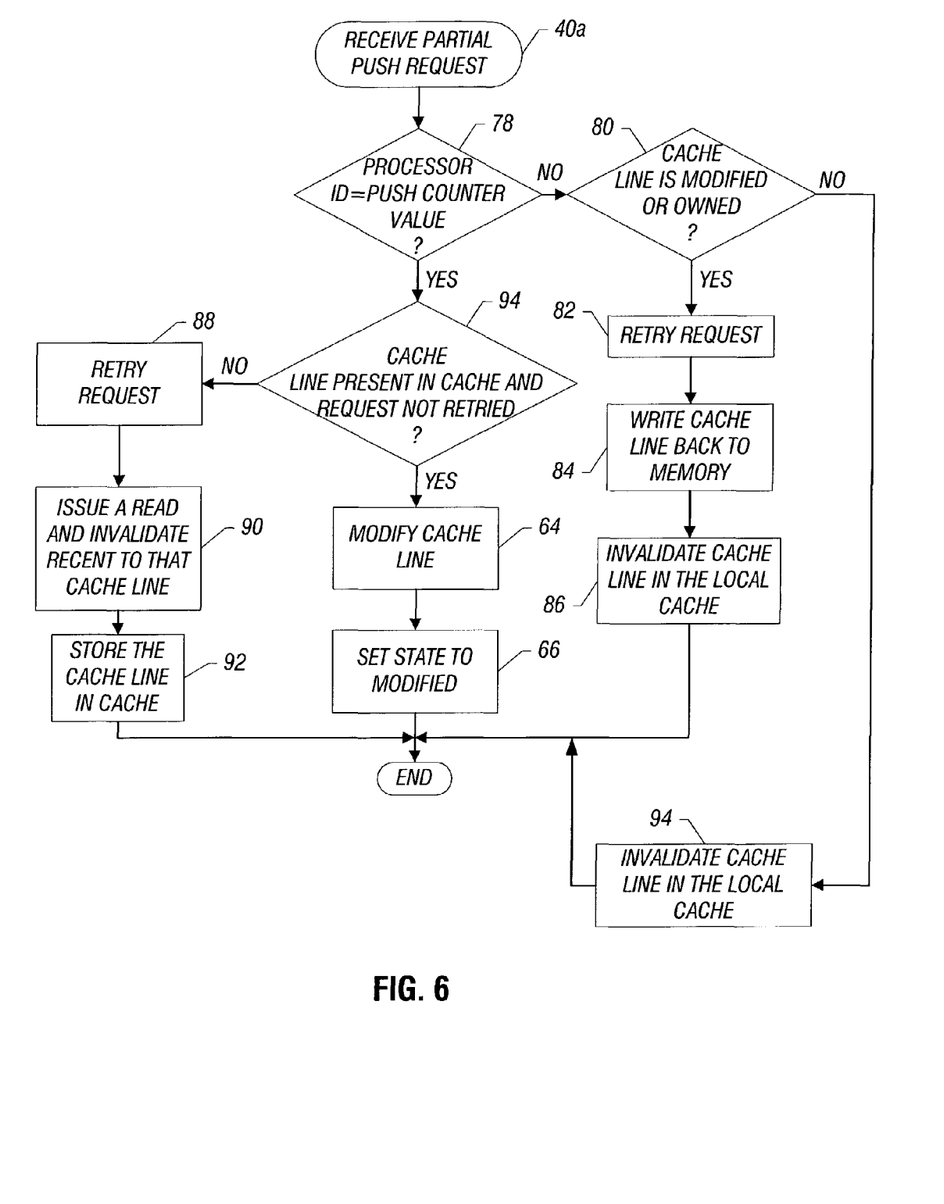
FIG. 6 is a flow chart for the embodiment shown in FIG. 4 in accordance with one embodiment of the present invention.

Referring to FIG. 6, upon receiving a partial push request, the protocol 40a checks at diamond 78 to determine whether the processor's identifier is equal to the push counter value. If so, a check at diamond 94 determines whether the cache line is already present in the cache and the request is not retried. If so, the cache line is modified and set to the modified state as indicated in blocks 64 and 66.

If the cache line is not present in the cache, the request is retried as indicated in block 88. A read and invalidate (read for ownership) request is issued to that cache line as indicated in block 90 and the cache line is stored in the cache as indicated in block 92.

If the processor's identifier is not equal to the push counter value, then a check at diamond 80 determines whether the cache line is in either the modified or own state. If so, the request is retried as indicated in block 82 and the cache line is written back to system memory as indicated in block 84 and the cache line is invalidated in the local cache as indicated in block 86.

If the cache line is in either the exclusive or shared state as determined in diamond 80, then the cache line is invalidated in the local cache as indicated in block 94.

Figure 7:
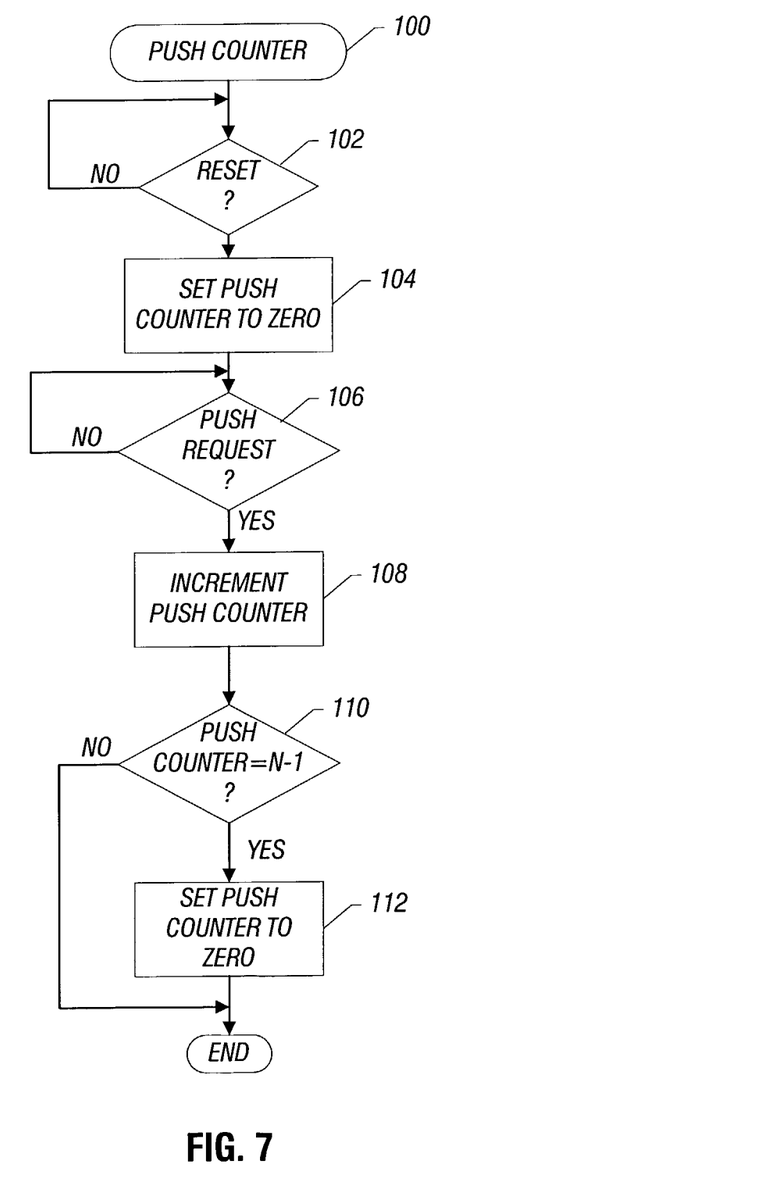
FIG. 7 is a flow chart for the embodiment shown in FIG. 4 in accordance with one embodiment of the present invention.

Referring to FIG. 7, the operation of the push counters 70 is further illustrated. The push counters 70 may be software or hardware-based devices. Initially a check at diamond 102 determines whether there has been a system reset. If so, the push counters 70 are set to zero as indicated in block 104. When a push request is generated, as determined in diamond 106, the processors 12 increment their push counters 70 by one as indicated in block 108. A check at diamond 110 determines whether the push counter value equals N−1. If so, the push counter 70 is reset to zero as indicated in block 112.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system comprising:
   a digital signal processor including a cache, said cache to receive direct memory accesses from the non-processor agents;
   a non-processor agent coupled to said processor; and
   a plurality of processors having caches which are directly accessible by non-processor agents, said processors having an identifier and said processors including a counter to count the number of access requests from non-processor agents.

2. The system of claim 1 wherein the one or more processors determine whether it is the target of the push requests by non-processor agent using a comparison of the identifier and the counter value.

3. The system of claim 1 including at least two processors with caches, said processors to determine which cache is targeted by the push request from a non-processor agent.

4. The system of claim 1 wherein a value of said counter is compared to the identifier assigned to the processor to determine whether the processor will handle a push request to access a cache by the non-processor agent.

* * * * *